(No Model.) 2 Sheets—Sheet 1.
J. W. WILSON.
DUST COLLECTOR.
No. 595,256. Patented Dec. 7, 1897.
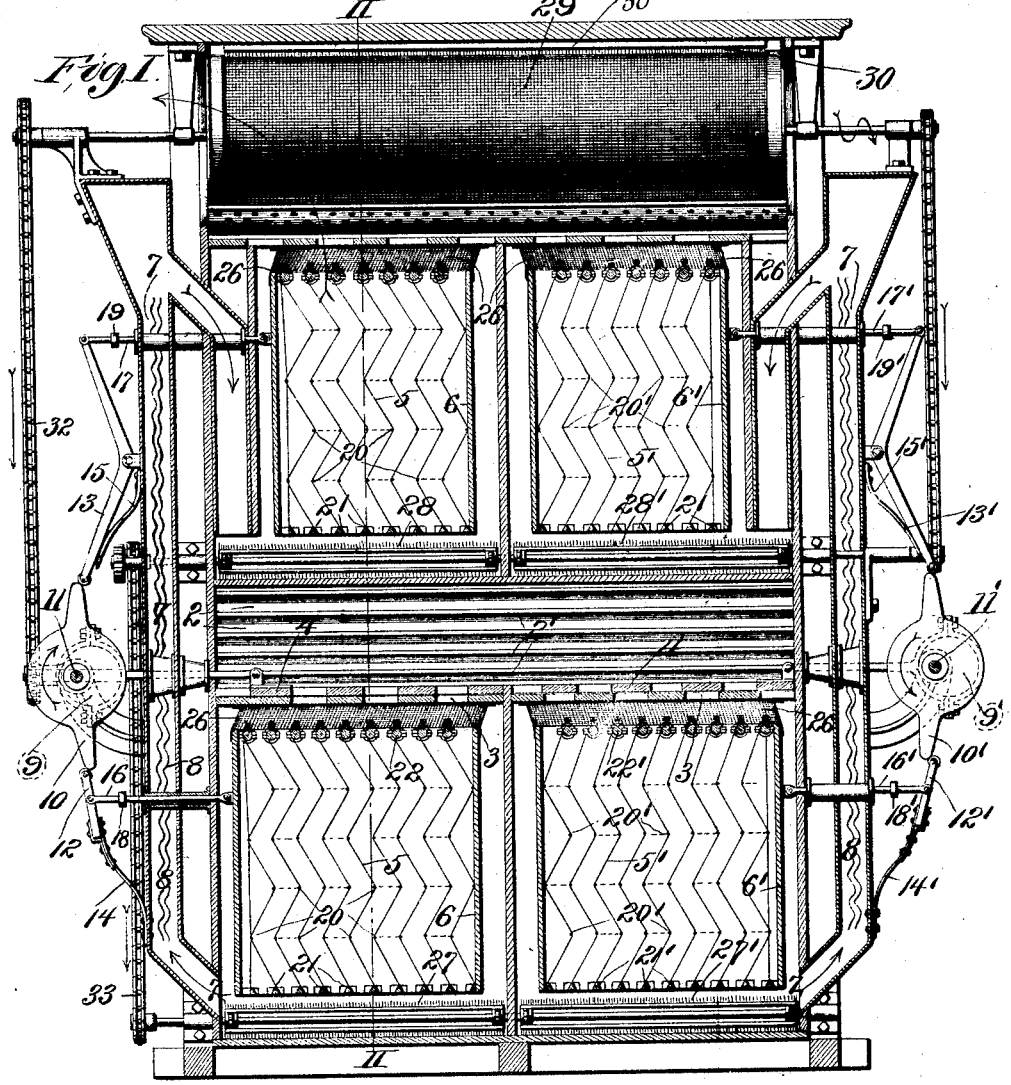
Fig. I.
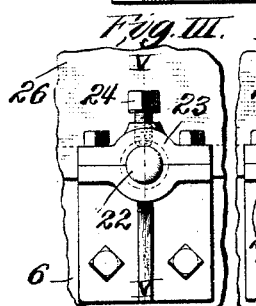
Fig. III. Fig. IV.
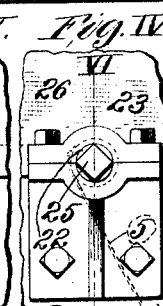
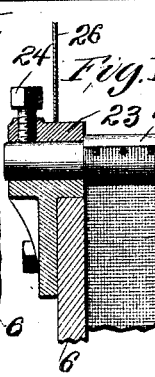
Fig. V.
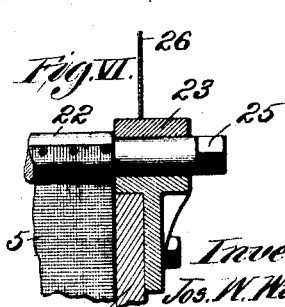
Fig. VI.
Attest:
Wm. H. Scott
Stanley Stoner
Inventor:
Jos. W. Wilson.
By Knight Bros.
Attys

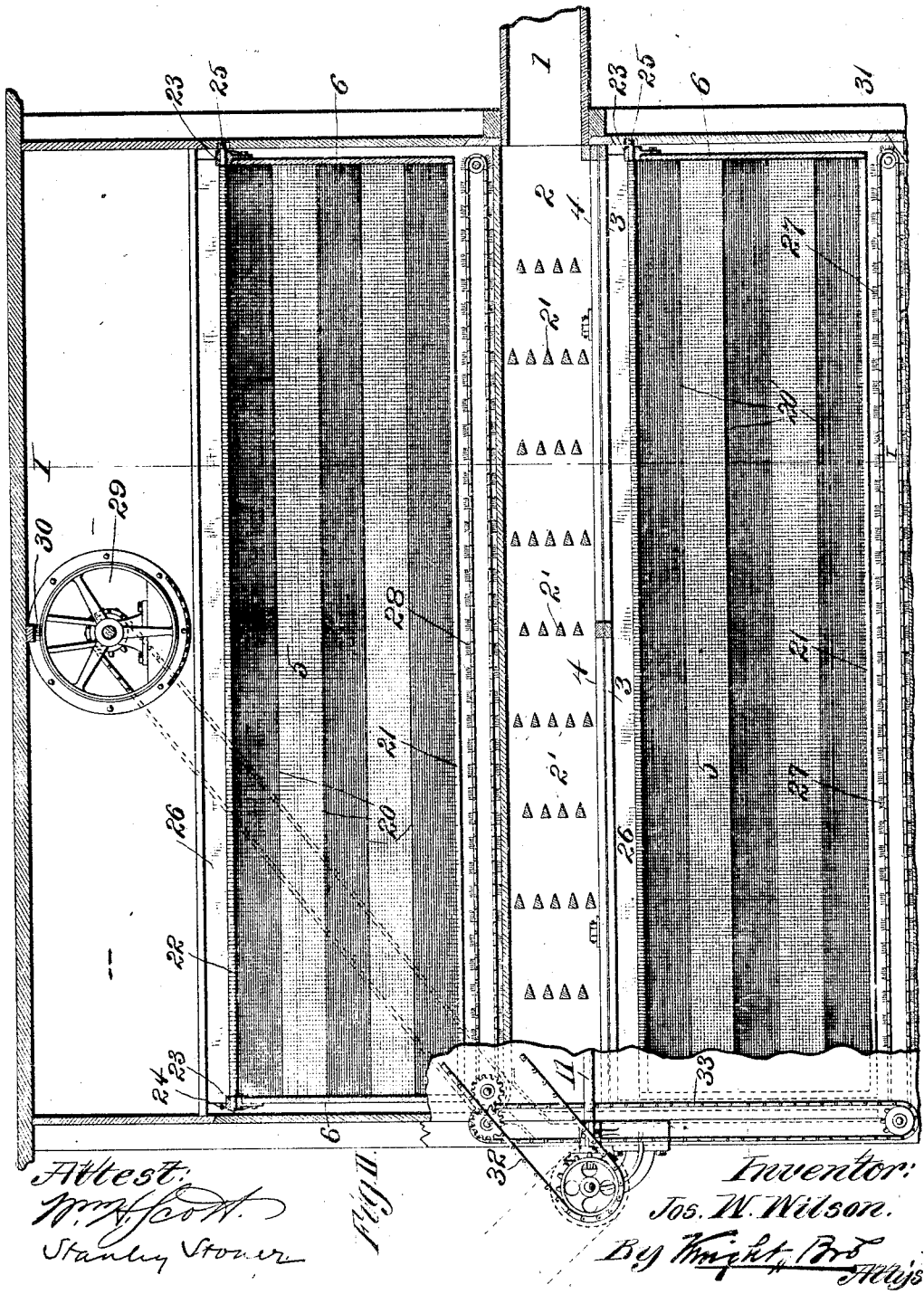

UNITED STATES PATENT OFFICE.

JOSEPH W. WILSON, OF SALT LAKE CITY, UTAH.

DUST-COLLECTOR.

SPECIFICATION forming part of Letters Patent No. 595,256, dated December 7, 1897.

Application filed September 12, 1896. Serial No. 605,660. (No model.)

*To all whom it may concern:*

Be it known that I, JOSEPH W. WILSON, a citizen of the United States, residing at Salt Lake City, in the county of Salt Lake and State of Utah, have invented a certain new and useful Improvement in Dust-Collectors, of which the following is a full, clear, and exact description, reference being had to the accompanying drawings, forming a part of this specification.

The object of my invention is to provide an improved vibrating or shaking screen-box adapted to be used in dust-collectors.

My present invention is an improvement on the device described in my Letters Patent No. 568,968, dated October 6, 1896.

Referring to the drawings, Figure I illustrates a vertical transverse section of the dust-collector, taken along the line I I of Fig. II, showing my improved screen-boxes placed therein. Fig. II is a vertical longitudinal section taken along the line II II of Fig. I, a part of one end being in elevation. Fig. III is a detail end view of the set-screw and shaft to which the screen-cloth is fastened. Fig. IV is a similar view of the opposite end. Fig. V is a vertical section taken along the line V V of Fig. III. Fig. VI is a corresponding vertical section taken along the line VI VI of Fig. IV.

1 is the opening through which the dust-laden air enters, and 2 is the chamber into which the said air is introduced. 2' are V-shaped deflectors placed in this chamber to weaken the force of the air-current.

3 are openings in the bottom of the chamber 2.

4 is a sliding valve adapted to close and open the openings 3.

5 are a series of screens placed within the chambers formed by the walls of vibrating or shaking upper and lower screen-boxes 6 6'.

7 are passages on each side of the device leading from the bottom of the lower screen-boxes 6 6' to the top of the casing, as shown, and then downwardly.

8 are corrugated or fluted screens placed within the passages 7.

9 and 9' are eccentrics carried on suitable shafting, having attached thereto an arm controlling the opening and closing of the valves 4.

10 and 10' are tappets carried on suitable shafting 11 11', there being one such tappet on each side of said shafting. They are adapted as they revolve to alternately strike the fingers 12, 13, 12', and 13', said fingers being held in place by means of the springs 14, 15, 14', and 15'.

It will be seen that as the tappets revolve and come in contact with the fingers the rods 16, 17, 16', and 17' are carried outward until the further revolution of the tappet releases the fingers, when the said rods 16, 17, 16', and 17' will violently return to place, riding in their housings by means of the springs 14, 15, 14', and 15'. The motion is limited by means of the shoulders 18, 19, 18', and 19'. The inner ends of the rods 16, 17, 16', and 17' are attached to the boxes 6 6'. Suitable motion being thus imparted to the boxes 6 6' and the dust-laden air being directed into these boxes, as described, it is necessary to place screens therein in order to separate the impurities from the said air. This I accomplish by means of the screens 5 of cloth strung therein in the following manner: Through the ends of the boxes 6 6' are pierced holes through which wires 20 are passed, as shown. 21 are slats extending lengthwise of the bottoms of the boxes, which are V-shaped, placed with the angle upward to prevent the dust collecting thereon. The screens 5 are attached to the inclined surfaces of these slats and then crossed back and forth over the wires 20, making an irregular or zigzag surface, as shown. The other ends are attached to the shafts 22. These shafts 22 revolve in journal-boxes 23, attached to the boxes 6 6', and constitute a means for keeping them tight. One end, Figs III and V, is provided with a set-screw 24. The other end 25 projects beyond the journal and is squared. This permits the use of a wrench. Thus when the cloth becomes slack the set-screw 24 is loosened, a wrench is inserted over the square end 25, the shaft 22 revolved until the cloth screen 5 is tight, and then the set-screw 24 is fastened and the device ready for use again.

The boxes 6 are provided with a flexible connection 26 to the stationary part of the collector. By this means no dust passing into the moving boxes 6 6' through the fixed openings 3 can escape, but all the air and the impurities carried with it is forced through the screens.

As shown in the drawings, the screen-boxes are arranged in two tiers, the air first being forced into the chamber 2, placed between them. It passes downward through the lower set, depositing an amount of sediment on the conveyer-brushes 27 27'. The air-current then passes up the passages 7 into the upper chambers, being introduced into said upper chambers from below.

28 and 28' are conveyer-brushes placed at the bottom thereof to convey away the deposited sediment. The air finally passes through the openings in the tops of the upper boxes into the revolving cylinder 29, which is kept clean by a stationary or rotary brush 30, placed above it. The force of the air-current is broken first by the deflectors 2' and next by the screens in the lower boxes.

It is further broken by the corrugated pieces 8 within the passages 7. By the time it reaches the upper boxes it has hardly power enough to carry any impurities, but should any remain they are removed while the air is passing into the cylinder 29.

It will be noticed that the two lower boxes are guarded by valves 4, which alternate, so that when one box is open the other is closed, forming a dead-air box. The knocking caused by the tappets, already described, knocks off any substances which may have adhered to the screens.

31 is the exit for the separated impurities.

The motion for the traveling brushes and for the revolving cylinder is obtained by means of suitable gearing 32 33, propelled by any convenient source of power.

The advantage gained by my present invention over that described in my application referred to is in the improved construction for securing the screens 5. Screens used in dust-collectors is very apt to become loose, as the motion necessary to knock off impurities is very violent. By the construction I have described the irregular or zigzag surface may be preserved and the screen-cloth may be kept tight.

I claim as my invention—

A vibrating or shaking screen-box for dust-collectors comprising end walls provided with series of vertical rows of perforations, the wires supported in the said holes, the inverted-V-shaped slats forming the bottom of the box, the series of journal-boxes mounted on the end walls, the series of adjustable shafts mounted in the journal-boxes, set-screws for securing the shafts to their adjustment, the series of irregular or zigzag screens secured to the inclines of the slats and passed back and forth between the vertical rows of wires, and secured at their upper ends to the shafts, and the flexible connection whereby the screen-box is suspended; substantially as described.

JOS. W. WILSON.

In presence of—
E. J. WILTS,
G. B. BLAKELY.